(12) United States Patent
Auerbach et al.

(10) Patent No.: US 12,469,919 B2
(45) Date of Patent: Nov. 11, 2025

(54) FLIGHT CONTROL SYSTEM AND METHOD FOR AN AIRCRAFT

(71) Applicant: BETA AIR, LLC, South Burlington, VT (US)

(72) Inventors: Joshua E. Auerbach, Waterbury Center, VT (US); Andrew Giroux, Georgia, VT (US); Timothy Gerard Richter, South Burlington, VT (US); Herman Wiegman, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 127 days.

(21) Appl. No.: 18/097,035

(22) Filed: Jan. 13, 2023

(65) Prior Publication Data

US 2023/0170570 A1  Jun. 1, 2023

Related U.S. Application Data

(63) Continuation-in-part of application No. 17/878,006, filed on Jul. 31, 2022, now Pat. No. 11,742,546, and
(Continued)

(51) Int. Cl.
| | |
|---|---|
| *H01M 50/249* | (2021.01) |
| *B60L 3/00* | (2019.01) |
| *B60L 50/60* | (2019.01) |
| *B60L 50/64* | (2019.01) |
| *H01M 10/48* | (2006.01) |

(52) U.S. Cl.
CPC ......... *H01M 50/249* (2021.01); *B60L 3/0046* (2013.01); *B60L 50/64* (2019.02); *B60L 50/66* (2019.02); *H01M 10/48* (2013.01); *H01M 2220/20* (2013.01)

(58) Field of Classification Search
CPC ......... B64C 13/505; B64C 13/04; B64C 9/00; B64C 2009/005; B64C 29/0025
See application file for complete search history.

(56) References Cited

U.S. PATENT DOCUMENTS

| | | | |
|---|---|---|---|
| 4,800,798 A | * | 1/1989 | Boldrin .................. F15B 18/00 416/114 |
| 6,060,141 A | | 5/2000 | Harvey |

(Continued)

FOREIGN PATENT DOCUMENTS

WO   WO2018/215649 A1   11/2018

OTHER PUBLICATIONS

Machine translation of reference Poh (CA Pub No. 3,052,416 A1) Pub date Feb. 23, 2020 (Year: 2020).*
(Continued)

*Primary Examiner* — Rodney A Bonnette
(74) *Attorney, Agent, or Firm* — Lee & Hayes, P.C.

(57) ABSTRACT

A system and method for flight control of an aircraft, the flight control system including a plurality of flight components coupled to an aircraft, wherein the plurality of flight components includes a plurality of redundant control surfaces, a plurality of redundant low voltage buses communicatively connected to the plurality of flight components, wherein a failure in a redundant low voltage bus of the plurality of redundant low voltage busses does not impact the operability of the aircraft.

20 Claims, 6 Drawing Sheets

Related U.S. Application Data a continuation-in-part of application No. 17/855,376, filed on Jun. 30, 2022, now Pat. No. 12,006,024, said application No. 17/878,006 is a continuation of application No. 17/479,828, filed on Sep. 20, 2021, now Pat. No. 11,469,473, said application No. 17/855,376 is a continuation of application No. 17/404,614, filed on Aug. 17, 2021, now Pat. No. 11,407,496.

(56) References Cited

U.S. PATENT DOCUMENTS

| | | | | |
|---|---|---|---|---|
| 6,860,452 | B2* | 3/2005 | Bacon | G05D 1/0077 701/4 |
| 9,787,948 | B2 | 10/2017 | De Carvalho | |
| 10,988,237 | B1* | 4/2021 | Kirkland | B64C 13/16 |
| 11,235,853 | B2 | 2/2022 | Pelletier | |
| 2005/0103929 | A1* | 5/2005 | Chang | B64C 3/16 244/45 R |
| 2005/0185352 | A1 | 8/2005 | Nguyen | |
| 2015/0029902 | A1 | 1/2015 | Tischler et al. | |
| 2017/0240281 | A1* | 8/2017 | Veto | B64C 9/00 |
| 2017/0283039 | A1* | 10/2017 | McCormick | B64C 9/22 |
| 2018/0233007 | A1 | 8/2018 | Williams | |
| 2018/0287398 | A1 | 10/2018 | Melack | |
| 2019/0078669 | A1* | 3/2019 | Liu | F16H 21/12 |
| 2020/0079501 | A1* | 3/2020 | Graves | B64U 50/19 |
| 2021/0339882 | A1 | 11/2021 | Ferrier et al. | |
| 2022/0269291 | A1 | 8/2022 | Teles Ferreira et al. | |

OTHER PUBLICATIONS

Machine translation of reference Bevirt et al. (WO Pub No. 2022/115132 A1) Pub date Jun. 2, 2022 (Year: 2022).*

False Canopy: Here's Why a Fake Canopy Painted on Underside of Fighter Jets; (Webpage); Sep. 17, 2019; https://fighterjetsworld.com/air/false-canopy-heres-why-a-fake-canopy-painted-on-underside-of-fighter-jets/18172/.

Office Action for U.S. Appl. No. 18/217,542, mailed on Feb. 1, 2024, Herman Wiegman, "Systems and Methods for Redundant Electric Power for an Electric Aircraft", 12 pages.

Search Report and Written Opinion for International Application No. PCT/US2024/011497, mailed May 23, 2024, 14 pages.

Office Action for U.S. Appl. No. 17/479,828, mailed on Mar. 29, 2022, Wiegman, "Systems and Methods for Redundant Electric Power for an Electric Aircraft", 11 pages.

Office Action for U.S. Appl. No. 17/878,006, mailed on Nov. 10, 2022, Wiegman, "Systems and Methods for Redundant Electric Power for an Electric Aircraft", 14 pages.

Invitation to Pay Additional Fees for International Application No. PCT/US2024/011497, Dated May 23, 2024, 14 pages.

Jensen, et al., "Flight Test Experience with an Electromechanical Actuator on the F-18 Systems Research Aircraft" 19th AIAA Digital Avionics Systems Conference; Oct. 31, 2000; 11 pages.

Search Report and Written Opinion for International Application No. PCT/US2024/011497, Dated Jul. 16, 2024, 20 pages.

Traverse, et al., "Airbus-Fly-by-Wire: a Tital Approach to Dependability" 25th International Congress of the Aeronautical Sciences; Dec. 31, 2004; 22 pages. <https://www.icas.org/ICAS_ARCHIVE/ICAS2006/PAPERS/050.PDF>.

* cited by examiner

FLIGHT CONTROL SYSTEM AND METHOD FOR AN AIRCRAFT

CROSS-REFERENCE TO RELATED APPLICATIONS

This application is a continuation-in-part of Non-provisional application Ser. No. 17/855,376 filed on Jun. 30, 2022 and entitled "SYSTEMS AND METHODS FOR REDUNDANT FLIGHT CONTROL IN AN AIRCRAFT," and Non-provisional application Ser. No. 17/878,006 filed on Jul. 31, 2022, and entitled "SYSTEMS AND METHODS FOR REDUNDANT ELECTRIC POWER FOR AN ELECTRIC AIRCRAFT," the entirety of which each is incorporated herein by reference.

FIELD OF THE INVENTION

The present invention generally relates to the field of flight control. In particular, the present invention is directed to a redundant flight control system and method for an aircraft.

BACKGROUND

In the operation of aircraft, it is essential for all components of the aircraft to remain fully functional in order for the aircraft to safely take off, maneuver, and land. During some flights, a component of the aircraft may experience a malfunction or failure, which will put the aircraft in an unsafe mode and compromise the safety of the aircraft, passengers, and onboard cargo.

SUMMARY OF THE DISCLOSURE

In an aspect, a flight control system for an aircraft, the flight control system including a plurality of flight components coupled to an aircraft, wherein the plurality of flight components includes a plurality of redundant control surfaces, a plurality of redundant low voltage buses communicatively connected to the plurality of flight components, wherein a failure in a redundant low voltage bus of the plurality of redundant low voltage busses does not impact the operability of the aircraft.

In another aspect, a method for flight control of an aircraft, the method including detecting, by a sensor, pilot input of a pilot control, wherein the pilot input is transmitted to a flight controller of an aircraft, wherein the aircraft includes, a plurality of flight components coupled to an aircraft, wherein the plurality of flight components includes a plurality of redundant control surfaces, and a plurality of redundant low voltage buses communicatively connected to the plurality of flight components, wherein a failure in a redundant low voltage bus of the plurality of redundant low voltage busses does not impact the operability of the aircraft, generating a failure datum corresponding to a disablement of a flight component of the plurality of flight components.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
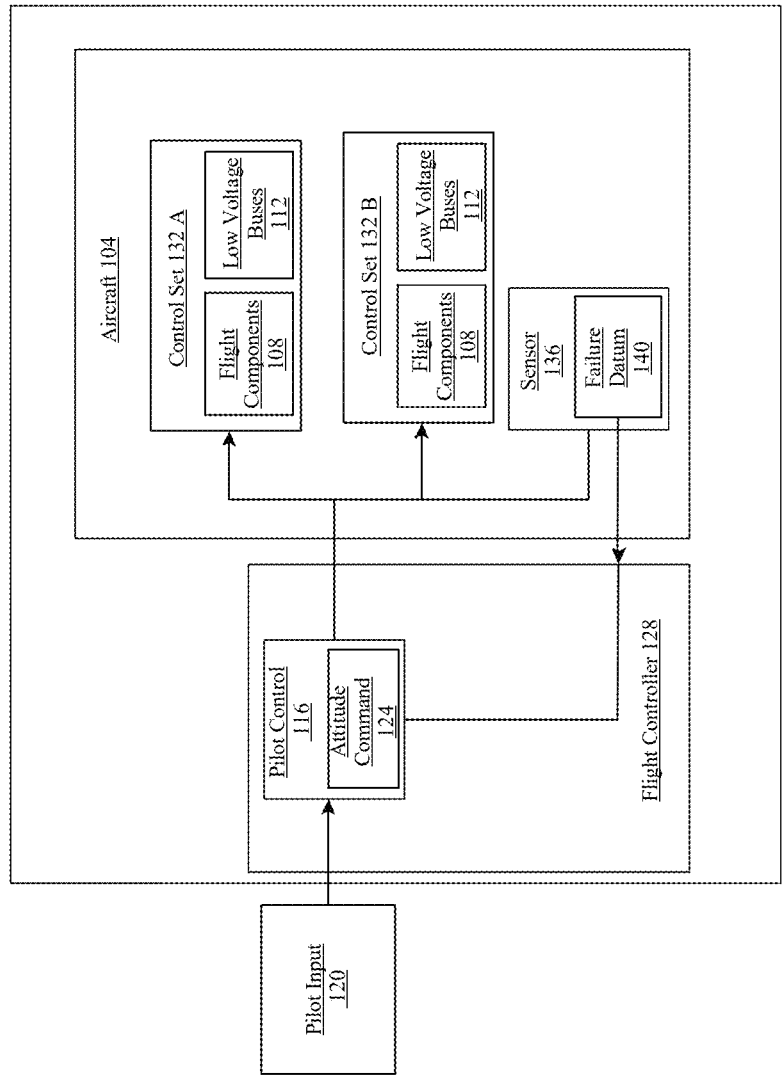
FIG. 1 is a block diagram illustrating an embodiment of a system for redundant flight control configured for use in an aircraft in accordance with aspects of the invention.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for redundant flight control configured for use in an aircraft. Aspects of the present disclosure can be used to enable the safe maneuvering of an aircraft during situations where there is a failure of an actuator, flight components, or power source needed to control flight of aircraft to continue and execute the expected flight plan.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 2. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

"Communicatively connected", for the purposes of this disclosure, is a process whereby one device, component, or circuit is able to receive data from and/or transmit data to another device, component, or circuit. Communicative connection may be performed by wired or wireless electronic communication, either directly or by way of one or more intervening devices or components. In an embodiment, communicative connection includes electrically connection an output of one device, component, or circuit to an input of another device, component, or circuit. Communicative connection may be performed via a bus or other facility for intercommunication between elements of a computing device. Communicative connection may include indirect connections via "wireless" connection, low power wide area network, radio communication, optical communication, magnetic, capacitive, or optical connection, or the like. In an embodiment, communicative connecting may include electrically connecting an output of one device, component, or circuit to an input of another device, component, or circuit. Communicative connection may be performed via a bus or other facility for intercommunication between elements of a computing device. Communicative connecting may include indirect connections via "wireless" connection, low power wide area network, radio communication, optical communication, magnetic, capacitive, or optical connection, or the like.

Aspects of the present disclosure allow for F. Exemplary embodiments illustrating aspects of the present disclosure are described below in the context of several specific examples.

Referring now to FIG. 1, an exemplary embodiment of a system 100 for a flight control system 100 for an aircraft 104 is introduced. Aircraft 104 may include an electric aircraft. For the purposes of this disclosure, an "electric aircraft" is an aircraft that derives its power primarily from electricity. System 100 includes a plurality of flight components 104 attached to aircraft 104, where a movement of flight component 108 is configured to adjust the attitude of aircraft 104. A "flight component" as described in this disclosure, is any aerodynamic surface attached to an aircraft and that interacts with forces to move the aircraft. Flight component 108 may include, as a non-limiting example, ailerons, flaps, leading edge flaps, rudders, elevators, spoilers, slats, blades, stabilizers, stabilators, airfoils, a combination thereof, or any other moveable surface used to control aircraft 104 in a fluid medium. The plurality of flight components 108 includes a plurality of redundant control surfaces. A "control surface," as used herein, is any flight components such as ailerons, flaps, leading edge flaps, rudders, elevators, spoilers, slats, blades, stabilizers, stabilators, airfoils, a combination thereof, or any other moveable surface used to control an aircraft in a fluid medium thereby affecting flight. The arrangement and composition of the plurality of flights components may result in redundancy. "Redundancy," as used in this disclosure, is the inclusion of components which are not strictly necessary to functioning, in case of failure in other components. For example, the redundant control surfaces may include at least two or more ailerons and at least two or more elevators located on each wing of the aircraft 104 such that when one of the at least two or more ailerons and/or one of the at least two or more elevators malfunctions, the aircraft 104 may still operate properly.

Still referring to FIG. 1, in one or more embodiments, system 100 may include a plurality of actuators, which includes a first actuator and a second actuator. Each of first actuator and second actuator may be attached to flight component 108 and configured to move flight component. As understood by one skilled in the art, though actuators are discussed as a pair of actuators, any number of actuators greater than one may be used to provide redundant flight control of an aircraft 104. In one or more embodiments, actuators may include pneumatic pistons, hydraulic pistons, and/or solenoid pistons. In other embodiments, actuators may use electrical components. For example, actuators may each include a hydraulic piston that extends or retracts to actuate flight component 108. In another example, actuators may each include a solenoid. Similarly, actuators may be triggered by electrical power, pneumatic pressure, hydraulic pressure, or the like. Actuators may also include electrical motors, servomotors, cables, and the like, as discussed further below.

Still referring to FIG. 1, system 100 includes a plurality of redundant low voltage buses 112 communicatively connected to the plurality of flight components, wherein a failure in a redundant low voltage bus 112 of the plurality of redundant low voltage busses 112 does not impact the operability of the aircraft 104. A "bus," as used in this disclosure and in electrical parlance, is any common connection to which any number of loads, which may be connected in parallel, and share a relatively similar voltage may be electrically coupled. A bus may be responsible for conveying electrical energy stored in a battery pack to the plauitry of flight components 108 of the aircraft 104. A bus may be electrically connected to a motor driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. A "battery pack," for the purpose of this disclosure, is a set of any number of individual battery modules or identical battery modules. Battery pack may include a plurality of battery cells. Battery pack may include a plurality of electrochemical cells. In a non-limiting embodiment, battery pack may be configured to deliver electrical power to a plurality of electrical systems of an aircraft 104. In a non-limiting embodiment, each battery pack of the plurality of battery packs may work in tandem to provide electrical energy to a plurality of electrical systems of an aircraft 104. For example and without limitation, battery pack may be used to power a flight component, a group of flight components, or a set of flight components, as described further below. Battery pack may include a battery management system integrated into the battery pack. For instance and without limitation, battery management system may be consistent with the disclosure of any battery management system in U.S. patent application Ser. No. 17/104,798 and title SYSTEMS AND METHODS FOR A BATTERY MANAGEMENT SYSTEM INTEGRATED IN A BATTERY PACK CONFIGURED FOR USE IN ELECTRIC AIRCRAFT," which is incorporated herein by reference in its entirety. Persons skilled in the art, upon reviewing the entirety of this disclosure, will be aware of the various flight components that may represent battery pack consistently with this disclosure.

With continued reference to FIG. 1, battery pack may include at least a first pack monitor unit (PMU) and at least a second pack monitor unit. A "first pack monitor unit," for the purpose of this disclosure, is a device configured to capture information regarding a battery pack. A "second pack monitor unit," for the purpose of this disclosure, is a device configured to capture information regarding a battery pack. In a non-limiting embodiment, first PMU and second PMU may be identical. In a non-limiting embodiment, second PMU may be configured to detect data after first PMU. First pack monitor unit and/or second pack monitor unit may include a microcontroller. The first pack monitor unit and/or second pack monitor unit may include a sensor. A "sensor," for the purposes of this disclosure, is an electronic device configured to detect, capture, measure, or combination thereof, a plurality of external and electric vehicle component quantities. Sensor may be integrated and/or connected to at least an actuator, a portion thereof, or any subcomponent thereof. Sensor may include a photodiode configured to convert light, heat, electromagnetic elements, and the like thereof, into electrical current for further analysis and/or manipulation. Sensor may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. First pack monitor unit may include a first sensor suite. First sensor suite may include a plurality of individual sensors. Second pack monitor unit may include a second sensor suite. Second sensor suite may include a plurality of individual sensors. In a non-limiting embodiment, first sensor suite may be identical to the second sensor suite. First pack monitor unit and/or second pack monitor unit may include a temperature sensor, digital temperature sensor, temperature probe, thermistors, thermocouples, and the like thereof. A "temperature sensor," for the purposes of this disclosure, is a device that detects and measure hotness and coolness of a battery pack and converts it into electrical signals. First pack monitor unit and/or second pack monitor unit may include an isolated controller area network (CAN) transceiver, a pressure sensor, a humidity sensor, an accelerometer, an inertial measurement unit (IU) a switching regulator, a serial peripheral interface (SPI), and the like thereof. In a non-limiting embodiment, first pack monitor unit may be identical to second pack monitor unit. In a non-limiting embodiment, first pack monitor unit and second pack monitor unit may be configured to measure identical targets. In a non-limiting embodiment, the at least first pack monitor unit may measure a different datum of a target the at least a second monitor unit may measure. In a non-limiting embodiment, first pack monitor unit and/or second pack monitor unit may be used to double check measuring of datum. In a non-limiting embodiment, first PMU may be configured to detect first battery pack datum initially and second PMU may be configured to detect a second battery pack datum after a time interval and/or buffer. For example and without limitation, second PMU may be configured to begin detecting a second battery pack datum ten nanoseconds after first PMU detects the first battery pack datum. For example and without limitation, second PMU may be configured to begin detecting a second battery pack datum sixty seconds after first PMU detects the first battery pack datum. Persons skilled in the art, upon reviewing the entirety of this disclosure, will be aware of the various purposes of detecting with a time buffer consistent with this disclosure.

With continued reference to FIG. 1, first PMU may be configured to detect first battery pack datum. Second PMU is configured to detect a second battery pack datum. A "first battery pack datum," for the purpose of this disclosure, is an element of data representing physical attributes of a battery pack. A "second battery pack datum," for the purposes of this disclosure, is an element of data representing physical attributes of a battery pack. In a non-limiting embodiment, first battery pack datum and second battery pack datum may be identical. In a non-limiting embodiment, second battery pack datum may be detected after first battery pack datum. First battery pack datum and/or second battery pack datum may include an identical datum of information. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The plurality of datum captured by sensor may include circuitry, computing devices, electronic components or a combination thereof that translates into at least an electronic signal configured to be transmitted to another electronic component. First battery pack datum and/or second battery pack datum may include identification numbers for a battery pack unit of a plurality of battery pack units. In a non-limiting embodiment, controller may assign first battery pack datum and/or second battery pack datum to a unique battery pack unit. First battery pack datum and/or second battery pack datum may include information describing, but not limited to, a voltage, resistance, current, impedance, distance traveled, and the like thereof. In a non-limiting embodiment, first battery pack datum may be different from second battery pack datum. For example and without limitation, first battery pack datum may include a voltage of a battery pack to be 800 volts while second battery pack datum may include a voltage of a battery pack to be 700 volts. For example and without limitation, first battery pack datum may include a current of a battery pack to be 100 kWh while second battery pack datum may include a voltage of a battery pack to be 80 kWh volts. First battery pack datum and/or second battery pack datum may include a temperature datum. A "temperature datum," for the purposes of this disclosure, is any datum or element of data describing the temperature of a battery pack. Temperature datum may include a heating parameter and a cooling parameter. Heating parameter may include a rate of temperature increase of a battery pack. Cooling parameter may include a rate of temperature decrease of a battery pack. For example and without limitation, temperature datum may include a temperature of 60 to 80 degrees Fahrenheit. For example and without limitation, cooling parameter may include a temperature of a battery to be any temperature below 40 degrees Fahrenheit. For example and without limitation, heating parameter may include a temperature of a battery to be any temperature above 100 degrees Fahrenheit. In a non-limiting embodiment, the temperature datum of first battery pack datum may be different from the temperature datum of second battery pack datum. For example and without limitation, temperature datum of first battery pack datum may include a temperature of a battery pack to be 70 degrees Fahrenheit while second battery pack datum may include a temperature of battery pack to be 100 degrees Fahrenheit. In a non-limiting embodiment, first battery pack datum and/or second battery pack datum may include total flight hours that battery pack and/or aircraft 104 have been operating. The first battery pack datum and/or second battery pack datum may include total energy flowed through battery pack. The first battery pack datum and/or second battery pack datum may include a maintenance history of the battery pack. The first battery pack datum and/or second battery pack datum may include an upper voltage threshold. The first battery pack datum and/or second battery pack datum may include a lower voltage threshold. The first battery pack datum and/or second battery pack datum may include a moisture level threshold.

With continued reference to FIG. 1, system 100 may include a controller. A "controller," for the purpose of this disclosure, is any computing device used to receive and transmit signals. Controller may include a flight controller 128 as described further below. Controller may include a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device may include a single computing device operating independently, or may include two or more computing device operating in concert, in parallel, sequentially or the like; two or more computing devices may be included together in a single computing device or in two or more computing devices. computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device may include but is not limited to, for example, a computing device or cluster of computing devices in a first location and a second computing device or cluster of computing devices in a second location. computing device may include one or more computing devices dedicated to data storage, security, distribution of traffic for load balancing, and the like. computing device may distribute one or more computing tasks as described below across a plurality of computing devices of computing device, which may operate in parallel, in series, redundantly, or in any other manner used for distribution of tasks or memory between computing devices. computing device may be implemented using a "shared nothing" architecture in which data is cached at the worker, in an embodiment, this may enable scalability of system 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, first PMIU and second PMIU may be configured to transmit first battery pack datum and second battery pack datum to controller. Controller may include any computing device as described in the entirety of this disclosure. In a non-limiting embodiment, first PMIU and second PMIU may transmit the plurality of battery pack datum as a function of a plurality of physical controller area network (CAN) bus unit. A "physical controller area network bus," as used in this disclosure, is vehicle bus unit including a central processing unit (CPU), a CAN controller, and a transceiver designed to allow devices to communicate with each other's applications without the need of a host computer which is located physically at the aircraft 104. For instance and without limitation, physical controller area network bus unit may be consistent with disclosure of any physical controller area network bus in U.S. patent application Ser. No. 17/218,342 and title "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated herein by reference in its entirety. In a non-limiting embodiment, first PMU may transmit first battery pack datum to controller as a function of a first physical CAN bus unit. In a non-limiting embodiment, second PMU may transmit second battery pack datum to controller as a function of a second CAN bus unit. Persons skilled in the art, upon reviewing the entirety of this disclosure, will be aware of the plurality of physical CAN bus unit representing the first CAN bus unit and the second CAN bust unit consistent with this disclosure.

With continued reference to FIG. 1, system 100 may include a pilot control 116 communicatively connected to a flight controller, wherein the pilot control 116 is configured to transmit at least a pilot input 120 to the flight controller. A "pilot control," as used in this disclosure is an device used to receive commands from a pilot related to the aircraft. A "pilot input," as used herein, is data relating to the control or management of an aircraft. Pilot control 116 may be communicatively connected to any other component presented in system 100. "Communicative connected", for the purposes of this disclosure, refers to two or more components electrically, or otherwise connected and configured to transmit and receive signals from one another. Signals may include electrical, electromagnetic, visual, audio, radio waves, or another undisclosed signal type alone or in combination. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. The communicative connections may include redundant connections configured to safeguard against single-point failure. Pilot control 116 may include circuitry, computing devices, electronic components, or a combination thereof that translate pilot input 120 into at least an electronic signal, such as attitude command 124, configured to be transmitted to another electronic component. Pilot control 116 may be a mechanical and/or electrical component that causes actuators and flight components to operate. Pilot control 116 may be physically located in the cockpit of aircraft 104 or remotely located outside of aircraft 104 in another location communicatively connected to at least a portion of aircraft 104. Pilot control 116 may generate and/or transmit an attitude command 124 to the flight controller 128 and/or the plurality of flight components. Pilot control 116 may include a pilot interfacing component. The pilot interfacing component may be an inceptor stick, collective pitch control, brake pedals, pedal controls, steering wheel, throttle lever, toggles, joystick, or control wheel. One of ordinary skill in the art, upon reading the entirety of this disclosure would appreciate the variety of input controls that may be present in an aircraft 104 consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. Additionally, or alternatively, pilot input 120 may include one or more data sources providing raw data. "Raw data", for the purposes of this disclosure, is data representative of aircraft 104 information that has not been conditioned, manipulated, or processed in a manner that renders data unrepresentative of aircraft 104 information. In exemplary embodiments, pilot input 120 may be provided by a pilot or an automation system. Pilot input 120 may be exterior sensor data, interior sensor data, data retrieved from one or more remotely or onboard computing devices. Pilot input 120 may include audiovisual data, pilot voice data, biometric data, or a combination thereof. Pilot input 120 may include information or raw data gathered from gyroscopes, inertial measurement units (IMUs), motion sensor, a combination thereof, or another sensor or grouping of sensors. Pilot input 120 may include a physical manipulation of a control, such as a pilot using a hand and arm to push or pull a lever, or a pilot using a finger to manipulate a switch. Pilot input 120 may include a voice command by a pilot to a microphone and computing system consistent with the entirety of this disclosure.

Still referring to FIG. 1, in some embodiments, pilot input 120 may include an attitude command 124. Attitude command 124 may indicate a pilot's desire to change the heading or trim of an aircraft 104. "Attitude command", for the purposes of this disclosure, refers to at least an element of data identifying a pilot input and/or attitude control. An "attitude control," as used herein, is process of controlling the attitude of an aircraft. Attitude command 124 may describe a transition from fixed wing flight to rotor-based flight of an aircraft 104 as described further below. Attitude command 124 may indicate a pilot's desire to change an aircraft's pitch, roll, or yaw. "Pitch", for the purposes of this disclosure refers to an aircraft's angle of attack, that is the difference between the aircraft's nose and the horizontal flight trajectory. For example, an aircraft 104 pitches "up" when its nose is angled upward compared to horizontal flight, like in a climb maneuver. In another example, the aircraft 104 pitches "down", when its nose is angled downward compared to horizontal flight, like in a dive maneuver.

"Roll" for the purposes of this disclosure, refers to an aircraft's position about its longitudinal axis, that is to say that when an aircraft 104 rotates about its axis from its tail to its nose, and one side rolls upward, like in a banking maneuver. "Yaw", for the purposes of this disclosure, refers to an aircraft 104's turn angle, when an aircraft 104 rotates about an imaginary vertical axis intersecting the center of the earth and the fuselage of the aircraft 104. Attitude command 124 may be an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal.

Still referring to FIG. 1, in one or more embodiments, pilot control 116 may be controlled by flight controller 128. In another example, pilot control 116 may be a component of flight controller 128. In other embodiments, pilot control 116 may be flight controller 128. "Flight controller", for the purposes of this disclosure, refers to a component or grouping of components that control trajectory of the aircraft by taking in signals from a pilot and output signals to at least a propulsor and other portions of the aircraft, such as flight components, to adjust trajectory. Flight controller 128 may mix, refine, adjust, redirect, combine, separate, or perform other types of signal operations to translate pilot desired trajectory into aircraft 104 maneuvers. Flight controller 128, for example, may take in pilot input 120 of moving an inceptor stick of pilot control 116. The signal from that move may be sent to flight controller 128, which performs any number or combinations of operations on those signals, then sends out output signals to any number of aircraft 104 components that work in tandem or independently to maneuver the aircraft 104 in response to the pilot input 120. Flight controller 128 may condition signals such that they can be sent and received by various components throughout aircraft 104. Flight controller 128 may be designed and/or configured to perform any method, method step, or sequence of method steps in any embodiment described in this disclosure, in any order and with any degree of repetition. For instance, flight controller 128 may be configured to perform a single step or sequence repeatedly until a desired or commanded outcome is achieved. Repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 128 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Flight controller 128, as well as any other components or combination of components, may be connected to a controller area network (CAN), which may interconnect all components for signal transmission and reception.

Additionally and with continued reference to FIG. 1, flight controller 128 may include and/or communicate with any computing device, including without limitation a microcontroller, microprocessor, digital signal processor (DSP), and/or system on a chip (SoC). Flight controller 128 may be programmed to operate aircraft 104 to perform at least a flight maneuver. At least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller 128 may be designed and configured to operate the aircraft 104 via fly-by-wire. Flight controller 128 is communicatively connected to each actuator and, thus, each flight component. As a non-limiting example, flight controller 128 may transmit signals to actuators via an electrical circuit connecting flight controller 128 to actuators. The circuit may include a direct conductive path from flight controller 128 to actuators or may include an isolated connection such as an optical or inductive connection. Alternatively, or additionally, flight controller 128 may communicate flight using wireless communication, such as without limitation communication performed using electromagnetic radiation including optical and/or radio communication, or communication via magnetic or capacitive connection. Flight controller 128 may be fully incorporated in an aircraft 104 and may be a remote device operating the aircraft 104 remotely via wireless or radio signals, or may be a combination thereof, such as a computing device in the aircraft 104 configured to perform some steps or actions described in this disclosure while a remote device is configured to perform other steps. Persons skilled in the art will be aware, after reviewing the entirety of this disclosure, of many different forms and protocols of communication that may be used to communicatively connect flight controller 128 to actuators.

Still referring to FIG. 1, flight controller 128 may interface or communicate with one or more additional devices as described below in further detail via a network interface device. Network interface device may be utilized for connecting flight controller 128 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 128 may include but is not limited to, for example, a computing device or cluster of computing devices in a first location and a second computing device or cluster of computing devices in a second location. System 100 may include one or more computing devices dedicated to data storage, security, distribution of traffic for load balancing, and the like. Flight controller 128 may distribute one or more computing tasks as described below across a plurality of computing devices of computing device, which may operate in parallel, in series, redundantly, or in any other manner used for distribution of tasks or memory between computing devices. Flight controller 128 may be implemented using a "shared nothing" architecture in which data is cached at the worker, in an embodiment, this may enable scalability of flight controller 128 and/or computing device.

Still referring to FIG. 1, system 100 may include a plurality of control sets 132. A "control set," as used herein, is a set of components related to flight control of an aircraft. Control set 132 may be located on a wing of aircraft 104. For example, a control set 132 may be a set of flight components, redundant control surfaces, buses, batteries, actuators, and the like working in tandem to produce flight control. Control set 132 may be broken down to a plurality of component groups. A "component group," as used herein, is a group of components used in flight control of an aircraft that are part of a plurality of redundant components in a control set. For example, a component group may include a single alerion, a single elevator, and a single actuator working in tandem out of a plurality of redundant ailerons, elevators, and actuators located on the same wing of the aircraft 104. An "aileron," as used herein, is a flight control surface used to control the roll of an aircraft. "Elevators," as used herein, are flight control surfaces which control the aircraft's pitch. In some embodiments, the plurality of redundant control surfaces comprises at least two elevators located on one side of the aircraft. For the purposes of this disclosure, a "side" of the aircraft a portion of an aircraft defined by a vertical plane extending from the longitudinal axis of the aircraft. For example, an aircraft may be divided into two sides, one on each side of the longitudinal axis of the aircraft. In some embodiments, aircraft 104 may include one or a plurality of fixed wings attached to either side of the fuselage as described further blew. A "fixed wing," as used in this disclosure, is a wing that derives lift from the motion of air over aerodynamically designed surfaces that are rigidly and permanently attached to the fuselage. Each component group may be supplied by a separate low voltage bus 112. For example, a first component group may be connected to a first low voltage bus 112, wherein a second component group is connected to a second low voltage bus 112. System 100 may include control set 132 A located on a wing of the aircraft 104, and a control set 132 B located on an opposite wing to control set 132 A. Control set 132 A and control set 132 B may each contain two component groups for redundancy. For instance, and without limitation, in control set 132 A including a component group 1 and a component group 2, if an aileron in component group 1 malfunctions, loses communication, or otherwise does not operate as intended, it would not affect the flight control of the aircraft 104, as the aileron of competent group 2 may still be fully functionally to negate the malfunction of the aileron in group 1. In another example, if a low voltage bus 112 fails to supply power, malfunctions, loses communication, or otherwise does not operate as intended in connection to component group 1, it would not affect the flight control of the aircraft 104, as the low voltage bus 112 of component group 2 may still be fully functional to negate the lost operation of component group 1. Thus, control set 132 may be communicatively connected to receive data from pilot control 116 so that, if failure by one component group is detected, the other component group still provides flight control of the aircraft 104. In one or more embodiments, actuators in a control may receive attitude command 124 from pilot control 116 and simultaneously actuate to move flight component 108 together. In other embodiments, only one actuator may receive attitude command 124 to move flight component. For instance, and without limitation, first actuator may receive attitude command 124 from pilot control 116 to move flight component. Then, if the first actuator fails to move flight component, second actuator may move flight component, as discussed further in this disclosure. Actuators may each include components, processors, computing devices, sensors 136, or the like. Actuators may also include a computing device or plurality of computing devices consistent with the entirety of this disclosure. In one or more embodiments, pilot control 116 and/or actuators may communicate with, receive commands from, and/or provide commands to flight controller 128, as discussed further below.

In reference still to FIG. 1, system 100 may include a sensor 136 that is communicatively connected to pilot control 116 and plurality of actuators. Sensor 136 may be attached to aircraft 104 or to actuators, as discussed further disclosure. In one or more embodiments, sensor 136 is configured to detect attitude command 124 from pilot control 116, detect disablement of a component in a control set 132 as described above, and generate a failure datum 140 corresponding to the disablement. "Failure datum," as used herein, is any datum or element of data describing an event of a failure, abnormality, malfunction, or combination thereof, of an aircraft component. In one or more embodiments, pilot control 116 is configured to receive failure datum 140 from sensor 136 and, subsequently, generate attitude command 124 to second actuator to move flight component 108 accordingly.

In one or more embodiments, sensor 136 may be configured to time all communication between component groups and pilot control 116. Sensor 136 may detect that pilot control 116 has transmitted attitude command 124 to component group 1 and that a flight component 108 has not moved in response to attitude command 124. As a result, sensor 136 may determine the flight component 108 is disabled and, thus, communicate to pilot control 116 and/or flight controller 128 that flight component 108 in component group 1 is disabled. As a result, flight controller 128 may alert, for example, a pilot of the disablement and transmit a signal to component group 2 for flight control. Though sensor 136 is described as being attached to aircraft 104 and communicating with each competent group, as understood by one skilled in the art, in other embodiments, an actuator of a component group may include a sensor 136. Sensors 136, as described in this disclosure, are any device, module, and/or subsystems, utilizing any hardware, software, and/or any combination thereof to detect events and/or changes in the instant environment and communicate the information to the vehicle controller. Sensor 136 may be mechanically and/or communicatively connected, as described above, to aircraft 104. Sensor 136 may be configured to detect failure datum 140. Sensor 136 may be incorporated into aircraft 104 or be remote. Failure datum 140 may include, without limitation, an element of data identifying and/or describing a disablement of one or more of the plurality of actuators, flight components, buses, motors, battery packs, and the like. In an embodiment, sensor 136 may detect that flight component 108 did not move despite a pilot input 120 into pilot control 116 and, thus, generate failure datum 140 in response. Failure datum 140 may include, as an example and without limitation, a determination that a flight component 108 is operating insufficiently, such as, for example, if first actuator has been damaged or has lost communication.

Still referring to FIG. 1, in one or more embodiments, sensor 136 may include, as an example and without limitation, an environmental sensor 136. As used herein, an environmental sensor 136 may be used to detect ambient temperature, barometric pressure, air velocity, motion sensors 136 which may include gyroscopes, accelerometers, inertial measurement unit (IU), various magnetic, humidity, and/or oxygen. As another non-limiting example, sensor 136 may include a geospatial sensor 136. As used in this disclosure, a geospatial sensor 136 may include optical/radar/Lidar, GPS, and may be used to detect aircraft 104 location, aircraft 104 speed, aircraft 104 altitude and whether the aircraft 104 is on the correct location of the flight plan. Sensor 136 may be located inside aircraft 104. Sensor 136 may be inside a component of aircraft 104. In an embodiment, an environmental sensor 136 may sense one or more environmental conditions or parameters outside the aircraft 104, inside the aircraft 104, or within or at any component thereof, including without limitation an energy source, a propulsor, or the like. The environmental sensor 136 may further collect environmental information from the predetermined landing site, such as ambient temperature, barometric pressure, air velocity, motion sensors 136 which may include gyroscopes, accelerometers, inertial measurement unit (IMU), various magnetic, humidity, and/or oxygen. The information may be collected from outside databases and/or information services, such as Aviation Weather Information Services. Sensor 136 may detect an environmental parameter, a temperature, a barometric pressure, a location parameter, and/or other necessary measurements. Sensor 136 may detect voltage, current, or other electrical connection via a direct method or by calculation. This may be accomplished, for instance, using an analog-to-digital converter, one or more comparators, or any other components usable to detect electrical parameters using an electrical connection that may occur to any person skilled in the art upon reviewing the entirety of this disclosure. Persons skilled in the art, upon reviewing the entirety of this disclosure, will be aware of various ways to monitor the status of the system of both critical and non-critical functions.

With continued reference to FIG. 1, flight controller 128 may be configured to receive an electrical parameter related to the plurality of control sets 132, first battery pack datum, second battery pack datum, and other forms of data described throughout this disclosure. Such as, without limitation, flight controller 128 may be configured to receive failure datum 140 of actuators from sensor 136. The electrical parameter of actuators is any electrical parameter, as described in this disclosure. Flight controller 128 may be further configured to determine, using the electrical parameter, a power-production capability of the electrical energy source. Power-production capability, as described herein, is a capability to deliver power and/or energy to a load or component powered by an electrical energy source. A power-production capability may include a power delivery capability. As an example and without limitation, power delivery capability may include peak power output capability, average power output capability, a duration of time during which a given power level may be maintained, and/or a time at which a given power level may be delivered, including without limitation a peak and/or average power output capability. The time is provided in terms of a measurement of time in seconds and/or other units from a given moment, a measure of time in seconds and/or other units from a given point in a flight plan, or as a given point in a flight plan, such as, without limitation, a time when power may be provided may be rendered as a time at which an aircraft 104 arrives at a particular stage in a flight plan. As an example and without limitation, power-production capability may indicate whether peak power may be provided at or during a landing stage of flight. Power-production capability may include, as a further example and without limitation, energy delivery capability, such as a total amount of remaining energy deliverable by a given electrical energy source, as well as one or more factors such as time, temperature, or rate that may affect the total amount of energy available. As a non-limiting example, circumstances that increase output impedance and/or resistance of an electrical energy source, and thus help determine in practical terms how much energy may actually be delivered to components, may be a part of energy delivery capability.

Still referring to FIG. 1, in some embodiments the flight controller 128 is configured to include an outer loop, inner loop, and an inverse module. The outer loop may be configured to receive the pilot input 120 from the sensor 136; generate a rate setpoint as a function of the input datum of each pilot input 120 of the plurality of pilot inputs 120, wherein the rate setpoint is the desired pitch attitude roll attitude, and yaw rate as determined from each pilot input 120 of the plurality of pilot inputs 120; and transmit the rate setpoint to the inner loop. The inner loop may be configured to receive the rate setpoint from the outer loop and generate the moment datum as a function of the rate setpoint. The moment datum may be an element of data identifying and/or describing the moment that should be applied to the vehicle. The inner loop may be composed of a lead-lag filter for roll rate, yaw rate, and pitch rate, and an integrator that acts only on yaw rate. The inverse module may be configured to apply a dynamic inverse to each pilot input 120 of the plurality of pilot inputs 120 as a function of the moment datum. The dynamic inverse of each flight component 108 of the plurality of flight components 108 may be applied to actuate the flight components.

In one or more embodiments, sensor 136 may be a plurality of sensors 136 incorporated in system 100 and/or aircraft 104. The plurality of sensors 136 may be designed to detect a plurality of electrical parameters or environmental data in-flight, for instance as described above. The plurality of sensors 136 may, as a non-limiting example, include a voltage sensor 136, wherein the voltage sensor 136 is designed and configured to detect the voltage of one or more energy sources of aircraft 104 and/or actuators. As a further-non-limiting example, the plurality of sensors 136 may include a current sensor 136, wherein the current sensor 136 is designed and configured to detect the current of one or more energy sources of aircraft 104 and/or actuators. As a further non-limiting example, the plurality of sensors 136 may include a temperature sensor 136, wherein the temperature sensor 136 is designed and configured to detect the temperature of one or more energy sources of aircraft 104 and/or actuators. As a further non-limiting example, a plurality of sensors 136 may include a resistance sensor 136, wherein the resistance sensor 136 is designed and configured to detect the resistance of one or more energy sources of aircraft 104 and/or actuators. As another non-limiting example, a plurality of sensors 136 may include an environmental sensor 136, wherein the environmental sensor 136 may be designed and configured to detect a plurality of environmental data including, without limitation, ambient air temperature, barometric pressure, turbulence, and the like. The environmental sensor 136 may be designed and configured, without limitation, to detect geospatial data to determine the location and altitude of the aircraft 104 by any location method including, without limitation, GPS, optical, satellite, lidar, radar. The environmental sensor 136, as an example and without limitation, may be designed and configured to detect at least a parameter of the motor. For example, environmental sensor 136 may be designed and configured to detect motor of aircraft 104 or motor of each actuator. The environmental sensor 136 may be designed and configured, without limitation, to detect at least a parameter of flight components. Sensor 136 datum collected in flight, by sensors 136 as described in this disclosure, may be transmitted to flight controller 128 and/or pilot control 116 and may be used to calculate the power output capacity of an energy source and/or projected energy needs of aircraft 104 during flight.

Figure 2:
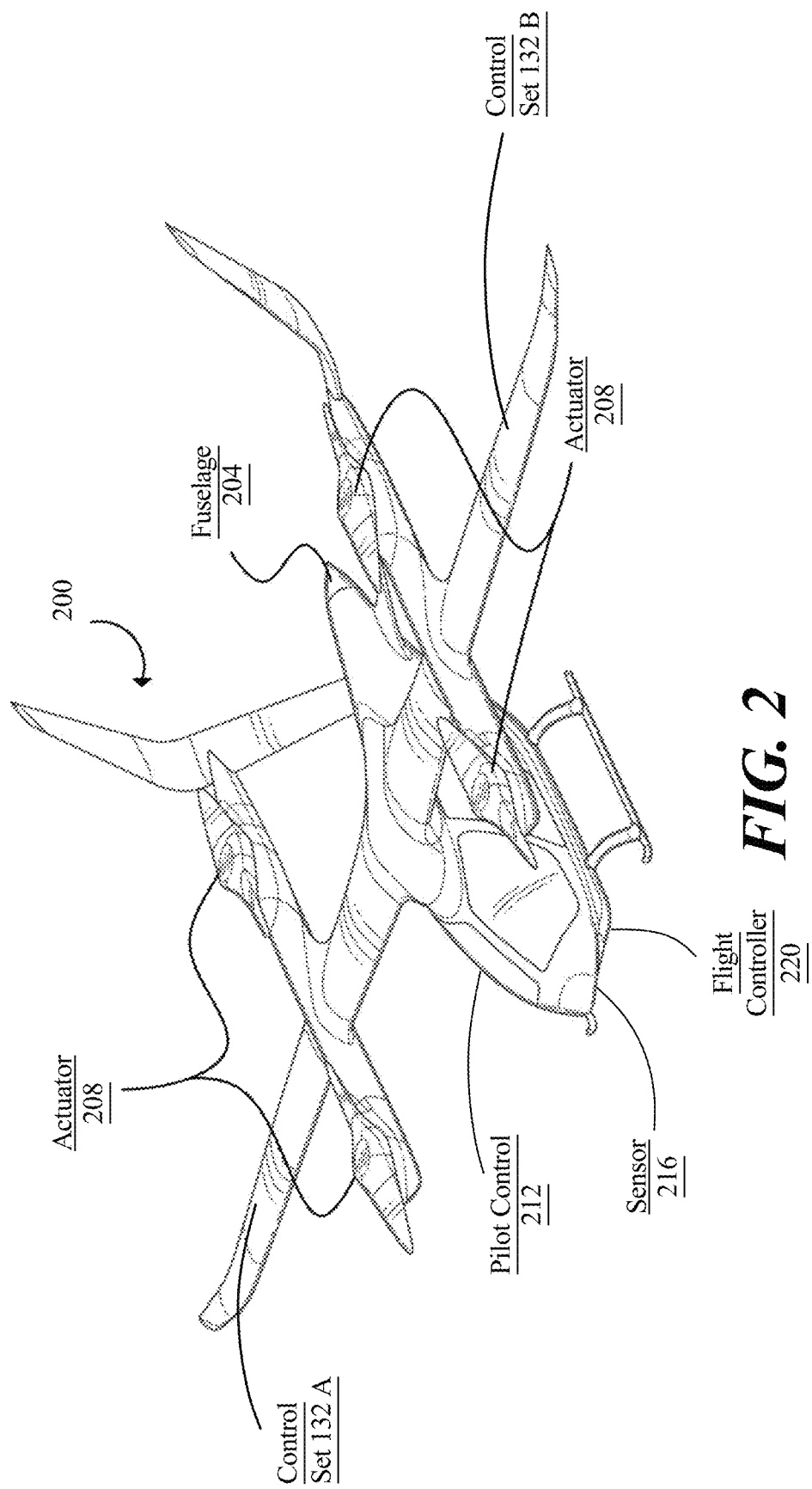
FIG. 2 is an illustrative embodiment of an electric aircraft.

Referring now to FIG. 2, an exemplary embodiment of an aircraft 200 is illustrated. Aircraft 200 may include an electrically powered aircraft. In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 2, aircraft 200 may include Control set 132 A and control set 132 B on either wing of the aircraft 200. In some embodiments, aircraft may include control set 132 A and control set 132 B on the tail of the aircraft. Aircraft 200 may include a fuselage 204. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 204 may comprise structural elements that physically support the shape and structure of an aircraft. Structural elements may take a plurality of forms, alone or in combination with other types. Structural elements may vary depending on the construction type of aircraft and specifically, the fuselage. Fuselage 204 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 2, aircraft 200 may include a plurality of actuators 208. In an embodiment, actuator 102 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 2, a plurality of actuators 208 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 208 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 208 may include a rudder, which may include, without limitation, a segmented rudder that produces a torque about a vertical axis. Additionally or alternatively, plurality of actuators 208 may include other flight control surfaces such as propulsors, rotating flight controls, or any other structural features which can adjust movement of aircraft 200. Plurality of actuators 208 may include one or more rotors, turbines, ducted fans, paddle wheels, and/or other components configured to propel a vehicle through a fluid medium including, but not limited to air.

Still referring to FIG. 2, plurality of actuators 208 may include at least a propulsor component. As used in this disclosure a "propulsor component" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 2, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7 forward. As a further non-limiting example, a fixed angle may be an angle of 7.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 7.3° inward, wherein propulsor component may be rotated and/or shifted to a second angle of 1.70 outward.

Still referring to FIG. 2, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 2, plurality of actuators 208 may include power sources, control links to one or more elements, fuses, and/or mechanical couplings used to drive and/or control any other flight component. Plurality of actuators 208 may include a motor that operates to move one or more flight control components and/or one or more control surfaces, to drive one or more propulsors, or the like. A motor may be driven by a motor drive, such as without limitation a direct current (DC) electric power and may include, without limitation, brushless DC electric motors, switched reluctance motors, induction motors, or any combination thereof. Alternatively or additionally, a motor drive may include an inverter. A motor drive may also include electronic speed controllers, inverters, or other components for regulating motor speed, rotation direction, and/or dynamic braking.

Still referring to FIG. 2, plurality of actuators 208 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Energy source may include a battery pack. Configuration of an energy source containing connected modules may be designed to meet an energy or power requirement and may be designed to fit within a designated footprint in an electric aircraft in which system may be incorporated.

In an embodiment, and still referring to FIG. 2, an energy source may be used to provide a steady supply of electrical power to a load over a flight by an electric aircraft 200. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO$_2$) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO$_2$), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 2, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/922,157 and 16/022,120 both entitled "SYSTEM AND METHOD FOR HIGH ENERGY DENSITY BATTERY MODULE" by S. Donovan et al., which are incorporated in their entirety herein by reference.

Still referring to FIG. 2, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 2, another exemplary actuator may include landing gear. Landing gear may be used for take-off and/or landing/Landing gear may be used to contact ground while aircraft 200 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 2, aircraft 200 may include a pilot control 212, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of actuators 208. For example and without limitation, collective control may alter and/or adjust the pitch angle of all of the main rotor blades collectively. For example, and without limitation pilot control 212 may include a yoke control. As used in this disclosure a "yoke control" is a mechanical control of an aircraft to control the pitch and/or roll. For example and without limitation, yoke control may alter and/or adjust the roll angle of aircraft 200 as a function of controlling and/or maneuvering ailerons. In an embodiment, pilot control 212 may include one or more footbrakes, control sticks, pedals, throttle levels, and the like thereof. In another embodiment, and without limitation, pilot control 212 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 200 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 200 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 2, pilot control 212 may be configured to modify a variable pitch angle. For example, and without limitation, pilot control 212 may adjust one or more angles of attack of a propeller. As used in this disclosure an "angle of attack" is an angle between the chord of the propeller and the relative wind. For example, and without limitation angle of attack may include a propeller blade angled 7.2°. In an embodiment, pilot control 212 may modify the variable pitch angle from a first angle of 2.71° to a second angle of 7.22°. Additionally or alternatively, pilot control 212 may be configured to translate a pilot desired torque for actuator 208. For example, and without limitation, pilot control 212 may translate that a pilot's desired torque for a propeller be 160 lb. ft. of torque. As a further non-limiting example, pilot control 212 may introduce a pilot's desired torque for a propulsor to be 290 lb. ft. of torque. Additional disclosure related to pilot control 212 may be found in U.S. patent application Ser. Nos. 17/001,225 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 2, aircraft 200 may include a loading system. A loading system may include a system configured to load an aircraft of either cargo or personnel. For instance, some exemplary loading systems may include a swing nose, which is configured to swing the nose of aircraft 200 of the way thereby allowing direct access to a cargo bay located behind the nose. A notable exemplary swing nose aircraft is Boeing 727. Additional disclosure related to loading systems can be found in U.S. patent application Ser. No. 17/137,592 entitled "SYSTEM AND METHOD FOR LOADING AND SECURING PAYLOAD IN AN AIRCRAFT" by R. Griffin et al., entirety of which in incorporated herein by reference.

Still referring to FIG. 2, aircraft 200 may include a sensor 216. Sensor 216 may be configured to sense a characteristic of pilot control 212. Sensor may be a device, module, and/or subsystem, utilizing any hardware, software, and/or any combination thereof to sense a characteristic and/or changes thereof, in an instant environment, for instance without limitation a pilot control 212, which the sensor is proximal to or otherwise in a sensed communication with, and transmit information associated with the characteristic, for instance without limitation digitized data. Sensor 216 may be mechanically and/or communicatively coupled to aircraft 200, including, for instance, to at least a pilot control 212. Sensor 216 may be configured to sense a characteristic associated with at least a pilot control 212. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 216 may include at least a geospatial sensor. Sensor 216 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 200 for both critical and non-critical functions. Sensor may be incorporated into vehicle or aircraft or be remote.

Still referring to FIG. 2, in some embodiments, sensor 216 may be configured to sense a characteristic associated with any pilot control described in this disclosure. Non-limiting examples of a sensor 216 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 216 may sense a characteristic as an analog measurement, for instance, yielding a continuously variable electrical potential indicative of the sensed characteristic. In these cases, sensor 216 may additionally comprise an analog to digital converter (ADC) as well as any additionally circuitry, such as without limitation a Whetstone bridge, an amplifier, a filter, and the like. For instance, in some cases, sensor 216 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 200, for instance without limitation a computing system, a pilot display, and a memory component. Alternatively or additionally, sensor 216 may sense a characteristic of a pilot control 212 digitally. For instance in some embodiments, sensor 216 may sense a characteristic through a digital means or digitize a sensed signal natively. In some cases, for example, sensor 216 may include a rotational encoder and be configured to sense a rotational position of a pilot control; in this case, the rotational encoder digitally may sense rotational "clicks" by any known method, such as without limitation magnetically, optically, and the like.

Still referring to FIG. 2, electric aircraft 200 may include at least a motor, which may be mounted on a structural feature of the aircraft. Design of motor may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor may include two main holes in top and bottom of mounting area to access bearing cartridge. Further, a structural feature may include a component of electric aircraft 200. For example, and without limitation structural feature may be any portion of a vehicle incorporating motor, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least an actuator 202. Persons skilled in the art, upon reviewing the entirety of this disclosure, will be aware of various materials, combinations of materials, and/or constructions techniques.

Still referring to FIG. 2, electric aircraft 200 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 2, a number of aerodynamic forces may act upon the electric aircraft 200 during flight. Forces acting on electric aircraft 200 during flight may include, without limitation, thrust, the forward force produced by the rotating element of the electric aircraft 200 and acts parallel to the longitudinal axis. Another force acting upon electric aircraft 200 may be, without limitation, drag, which may be defined as a rearward retarding force which is caused by disruption of airflow by any protruding surface of the electric aircraft 200 such as, without limitation, the wing, rotor, and fuselage. Drag may oppose thrust and acts rearward parallel to the relative wind. A further force acting upon electric aircraft 200 may include, without limitation, weight, which may include a combined load of the electric aircraft 200 itself, crew, baggage, and/or fuel. Weight may pull electric aircraft 200 downward due to the force of gravity. An additional force acting on electric aircraft 200 may include, without limitation, lift, which may act to oppose the downward force of weight and may be produced by the dynamic effect of air acting on the airfoil and/or downward thrust from the actuator 208 of the electric aircraft. Lift generated by the airfoil may depend on speed of airflow, density of air, total area of an airfoil and/or segment thereof, and/or an angle of attack between air and the airfoil. For example, and without limitation, electric aircraft 200 are designed to be as lightweight as possible. Reducing the weight of the aircraft and designing to reduce the number of components is essential to optimize the weight. To save energy, it may be useful to reduce weight of components of electric aircraft 200, including without limitation propulsors and/or propulsion assemblies. In an embodiment, motor may eliminate the need for many external structural features that otherwise might be needed to join one component to another component. Motor may also increase energy efficiency by enabling a lower physical propulsor profile, reducing drag and/or wind resistance. This may also increase durability by lessening the extent to which drag and/or wind resistance add to forces acting on electric aircraft 200 and/or propulsors.

With continued reference to FIG. 2, in some embodiments, electric aircraft 200 may include a flight controller 220. Flight controller 220 may be consistent with any flight controller disclosed in this disclosure.

Figure 3:
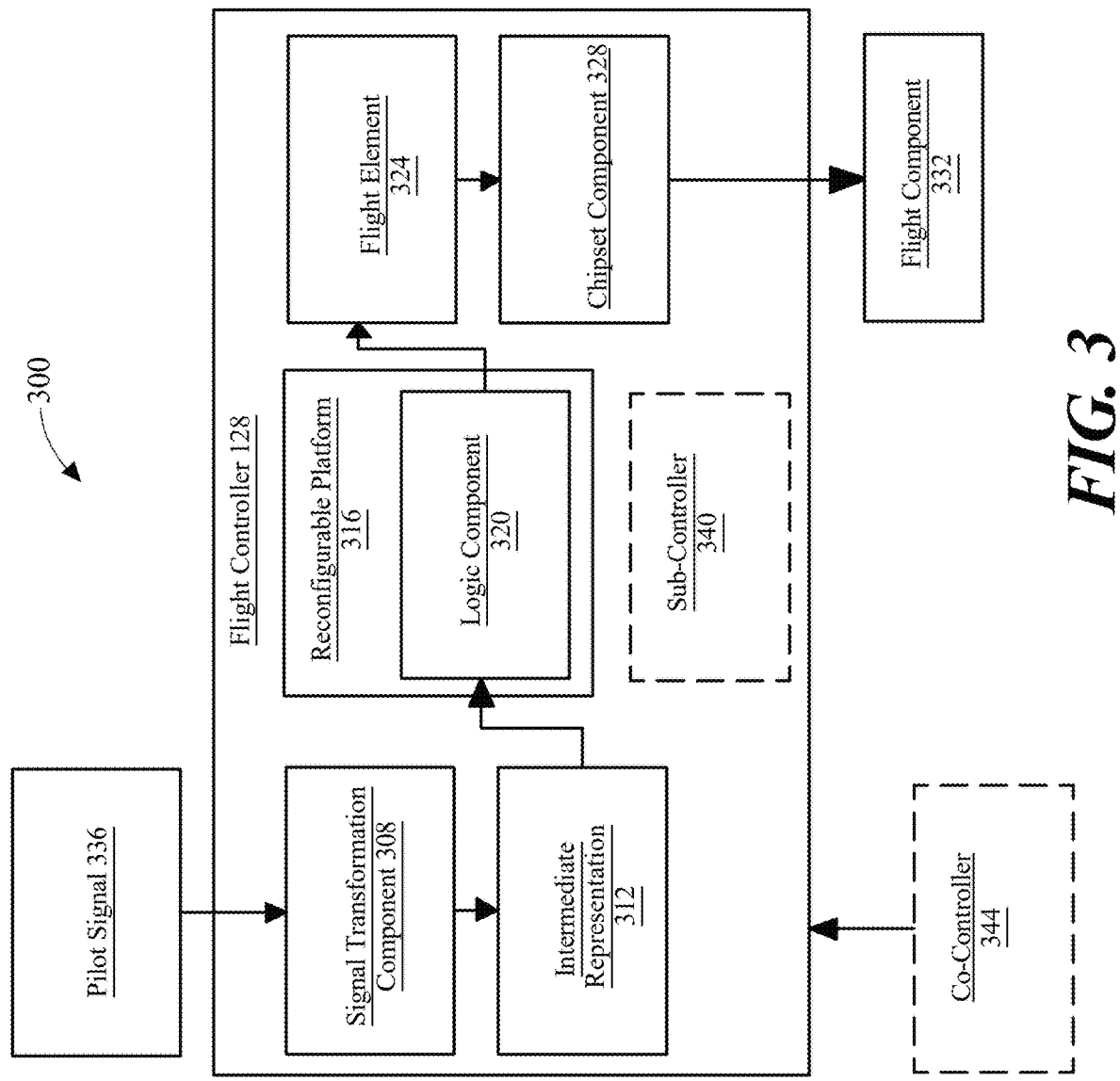
FIG. 3 is a block diagram illustrating an exemplary flight controller in accordance with aspects of the invention.

Now referring to FIG. 3, an exemplary embodiment of flight controller 132 is illustrated. Flight controller 132 may include and/or communicate with any computing device as described in this disclosure, including and without limitation a microcontroller, microprocessor, digital signal processor (DSP) and/or system on a chip (SoC) as described in this disclosure. Further, flight controller 132 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 128 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 128. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 128 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 128. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 128 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 128 may be configured generate an autonomous function. As used in this disclosure an "autonomous function" is a mode and/or function of flight controller 128 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 128 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 128 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 128 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 128 to control and/or maintain a portion of aircraft, a portion of the flight plan, the entire aircraft, and/or the entire flight plan. As a further non-limiting example, pilot signal 336 may include an implicit signal, wherein flight controller 128 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 128 and/or a remote device may or may not use in the generation of autonomous function. As used in this disclosure "remote device" is an external device to flight controller 128. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naive bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 128 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 128 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 128. Remote device and/or FPGA may transmit a signal, bit, datum, or parameter to flight controller 128 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 128 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 128 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 128 may include, but is not limited to, for example, a cluster of flight controllers in a first location and a second flight controller or cluster of flight controllers in a second location. Flight controller 128 may include one or more flight controllers dedicated to data storage, security, distribution of traffic for load balancing, and the like. Flight controller 128 may be configured to distribute one or more computing tasks as described below across a plurality of flight controllers, which may operate in parallel, in series, redundantly, or in any other manner used for distribution of tasks or memory between computing devices. For example, and without limitation, flight controller 128 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or softwares. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 128. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 128 may also be implemented using a "shared nothing" architecture in which data is cached at the worker, in an embodiment, this may enable scalability of aircraft and/or computing device. Flight controller 128 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs x; that may receive numerical values from inputs to a neural network containing the node and/or from other nodes. Node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 128 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 128 as components and/or nodes of a distributer flight controller as described above. For example, and without limitation, co-controller 344 may include one or more controllers and/or components that are similar to flight controller 128. As a further non-limiting example, co-controller 344 may include any controller and/or component that joins flight controller 128 to distributer flight controller. As a further non-limiting example, co-controller 344 may include one or more processors, logic components and/or computing devices capable of receiving, processing, and/or transmitting data to and/or from flight controller 128 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 128 may be designed and/or configured to perform any method, method step, or sequence of method steps in any embodiment described in this disclosure, in any order and with any degree of repetition. For instance, flight controller 128 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
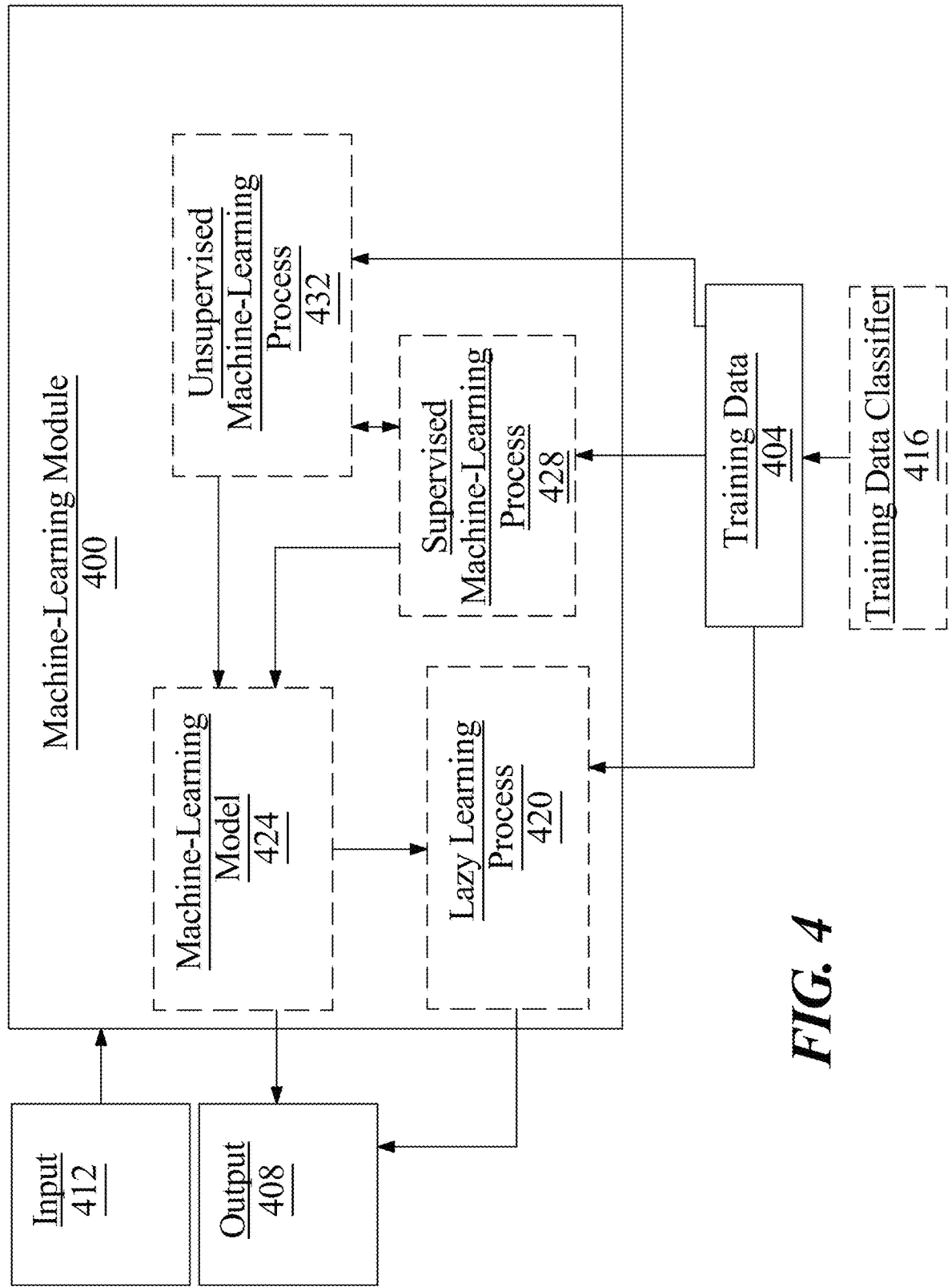
FIG. 4 is a block diagram illustrating an exemplary machine-learning module that can be used to implement any one or more of the methodologies disclosed in this disclosure and any one or more portions thereof in accordance with aspects of the invention.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
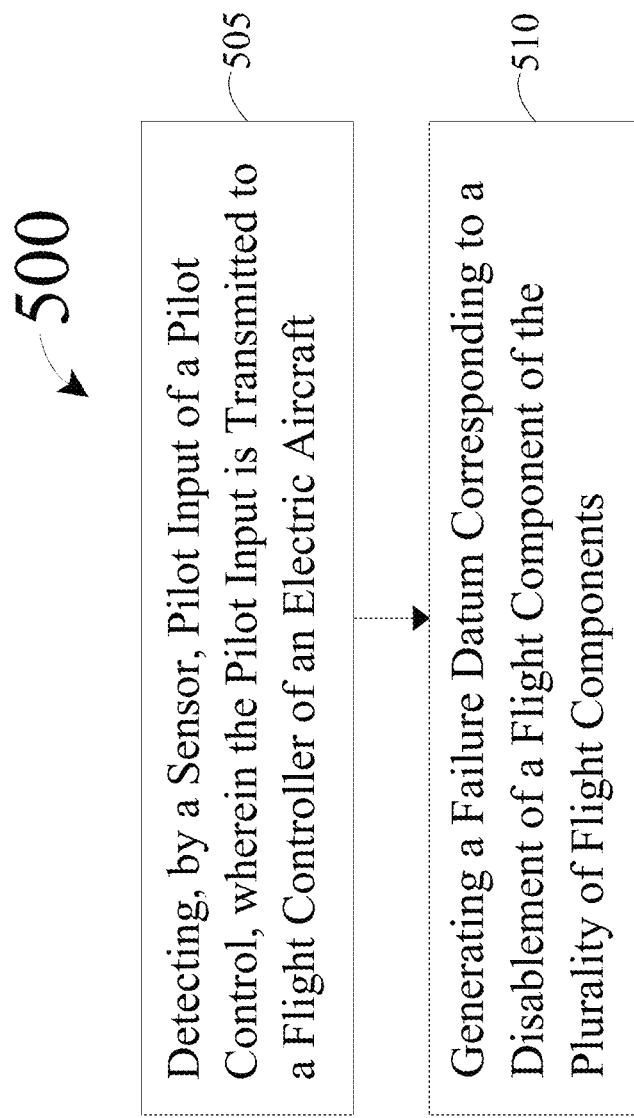
FIG. 5 is a flow diagram illustrating a method for flight control of an aircraft.

Referring now to FIG. 5, is a flow diagram of an exemplary method 500 for flight control of an electric aircraft. At step 505, method 500 includes detecting, by a sensor, pilot input of a pilot control, wherein the pilot input is transmitted to a flight controller of an electric aircraft, wherein the electric aircraft includes a plurality of flight components coupled to an electric aircraft, wherein the plurality of flight components may include a plurality of redundant control surfaces; and a plurality of redundant low voltage buses communicatively connected to the plurality of flight components, wherein a failure in a redundant low voltage bus of the plurality of redundant low voltage busses does not impact the operability of the electric aircraft. Step 505 may be implemented as described in FIGS. 1-4. A redundant control surface of the plurality of redundant control surfaces may include at least two ailerons located on a wing of the electric aircraft. A redundant control surface of the plurality of redundant control surfaces may include at least two elevators located on a side of the electric aircraft. The pilot control may be configured to control a pitch, roll, and yaw of the electric aircraft. The pilot input further may include an attitude command describing a transition from vertical flight to horizontal flight of the electric aircraft. At step 510, method 500 includes generating a failure datum corresponding to a disablement of a flight component of the plurality of flight components, for example and as implemented in FIGS. 1-4. The pilot control may be configured to receive the failure datum from the sensor and, subsequently, generate an attitude command to a second flight component of the plurality of components.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
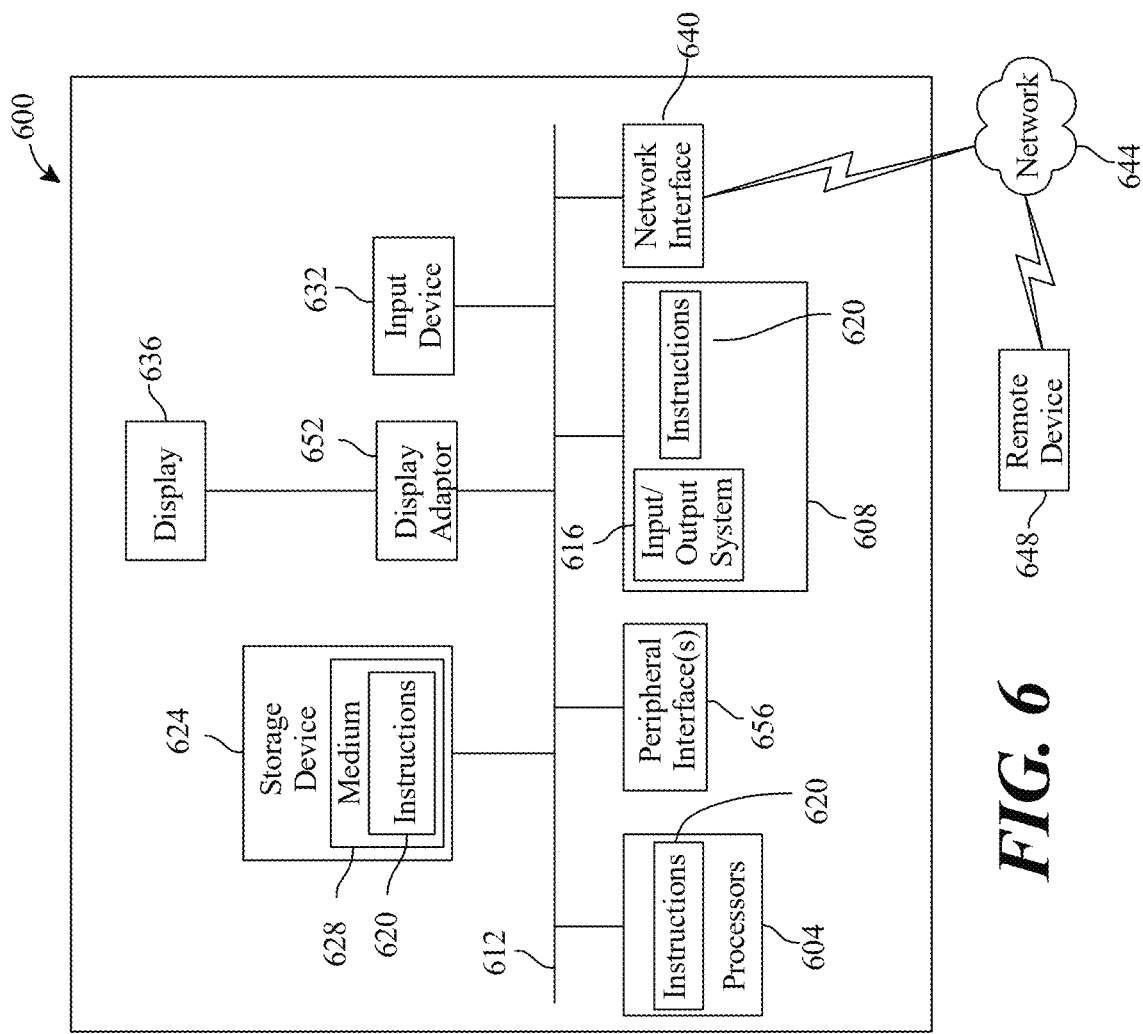
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensor; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A flight control system for an aircraft, the flight control system comprising:
    a plurality of flight components coupled to an aircraft, wherein the plurality of flight components comprises a plurality of redundant control surfaces; and
    a plurality of redundant low voltage buses communicatively connected to the plurality of flight components, wherein the plurality of redundant control surfaces include:
        a first aileron located on a first fixed wing of the aircraft that is connected to a first redundant low voltage bus;
        a second aileron located on the first fixed wing of the aircraft that is connected to a second redundant low voltage bus;
        a third aileron located on a second fixed wing of the aircraft that is connected to a third redundant low voltage bus; and
        a fourth aileron located on the second fixed wing of the aircraft that is connected to a fourth redundant low voltage bus, wherein the first aileron, the second aileron, the third aileron, and the fourth aileron are each independently electronically controllable; and
    a plurality of booms, the plurality of booms including:
        a first boom coupled to a first vertical take-off propulsor and a second vertical take-off propulsor, the first boom being perpendicularly coupled to the first fixed wing; and
        a second boom coupled to a third vertical take-off propulsor and a fourth vertical take-off propulsor, the second boom being perpendicularly coupled to the second fixed wing.

2. The flight control system of claim 1, further comprising a flight controller communicatively connected to the plurality of redundant control surfaces and configured to control the plurality of redundant control surfaces.

3. The flight control system of claim 1, further comprising a pilot control communicatively connected to a flight controller, wherein the pilot control is configured to transmit at least a pilot input to the flight controller.

4. The flight control system of claim 1, further comprising a sensor communicatively connected to a pilot control, wherein the sensor is configured to detect a pilot input of the pilot control and transmit the pilot input to a flight controller.

5. The flight control system of claim 4, wherein a control set of a plurality of control sets comprises at least two component groups.

6. The flight control system of claim 5, wherein a component group of the at least two component groups comprises a group of components used in flight control of an aircraft part of a plurality of redundant components in a control set.

7. The flight control system of claim 1, wherein a redundant control surface of the plurality of redundant control surfaces comprises at least two elevators located on one side of the aircraft.

8. The flight control system of claim 1, wherein the plurality of flight components and the plurality of redundant low voltage buses are categorized into a plurality of control sets.

9. The flight control system of claim 8, wherein a control set of the plurality of control sets is located on each wing of the aircraft.

10. The flight control system of claim 1, wherein a pilot control is configured to control a pitch, roll, and yaw of the aircraft.

11. The flight control system of claim 1, wherein a pilot input further comprises an attitude command describing a transition from vertical flight to horizontal flight of the aircraft.

12. The flight control system of claim 1, wherein a sensor is further configured to: detect an attitude command from a pilot control;
    determine that a flight component of the plurality of flight components is disabled; and generate a failure datum corresponding to a disablement of the flight component.

13. The flight control system of claim 12, wherein the pilot control is configured to receive the failure datum from the sensor and, subsequently, generate an attitude command to a second flight component of the plurality of flight components.

14. The flight control system of claim 1, wherein the plurality of redundant control surfaces include:
    a first elevator located on a first side of the aircraft that is connected to a fifth redundant low voltage bus;
    a second elevator located on the first side of the aircraft that is connected to a sixth redundant low voltage bus;

a third elevator located on a second side of the aircraft that is connected to a seventh redundant low voltage bus; and a fourth elevator located on the second side of the aircraft that is connected to an eighth redundant low voltage bus.

15. A method for flight control of an aircraft, the method comprising:
   detecting, by a sensor, pilot input of a pilot control, wherein the pilot input is transmitted to a flight controller of an aircraft, wherein the aircraft comprises:
      a plurality of flight components coupled to an aircraft, wherein the plurality of flight components comprises a plurality of redundant control surfaces; and
      a plurality of redundant low voltage buses communicatively connected to the plurality of flight components, wherein a failure in a redundant low voltage bus of the plurality of redundant low voltage buses does not impact operability of the aircraft; and
      a plurality of booms, the plurality of booms including:
         a first boom coupled to a first vertical take-off propulsor and a second vertical take-off propulsor, the first boom being perpendicularly coupled to a first fixed wing; and
         a second boom coupled to a third vertical take-off propulsor and a fourth vertical take-off propulsor, the second boom being perpendicularly coupled to a second fixed wing; and
   generating a failure datum corresponding to a disablement of a flight component of the plurality of flight components, wherein the plurality of redundant control surfaces include:
      a first elevator located on a first side of the aircraft that is connected to a first redundant low voltage bus;
      a second elevator located on the first side of the aircraft that is connected to a second redundant low voltage bus;
      a third elevator located on a second side of the aircraft that is connected to a third redundant low voltage bus; and
      a fourth elevator located on the second side of the aircraft that is connected to a fourth redundant low voltage bus, wherein the first elevator, the second elevator, the third elevator, and the fourth elevator are each independently electronically controllable.

16. The method of claim 15, wherein a redundant control surface of the plurality of redundant control surfaces comprises at least two ailerons located on a fixed wing of the aircraft.

17. The method of claim 15, wherein the pilot control is configured to control a pitch, roll, and yaw of the aircraft.

18. The method of claim 15, wherein the pilot input further comprises an attitude command describing a transition from vertical flight to horizontal flight of the aircraft.

19. The method of claim 15, wherein generating the failure datum comprises, receiving, by the pilot control, the failure datum from the sensor and, subsequently, generating an attitude command to a second flight component of the plurality of flight components.

20. The method of claim 15, wherein the plurality of redundant control surfaces include:
   a first aileron located on a first fixed wing of the aircraft that is connected to a fifth redundant low voltage bus;
   a second aileron located on the first fixed wing of the aircraft that is connected to a sixth redundant low voltage bus;
   a third aileron located on a second fixed wing of the aircraft that is connected to a seventh redundant low voltage bus; and
   a fourth aileron located on the second fixed wing of the aircraft that is connected to an eighth redundant low voltage bus.

* * * * *